April 25, 1967   R. F. TURNBULL ET AL   3,315,432
ROLL CRIMPING MACHINE Filed March 13, 1964   7 Sheets-Sheet 1

FIG___1

FIG___6

ROGER F. TURNBULL
SWAN CHRISTENSEN
GEORGE W. HERIGSTAD
    INVENTORS.

BY  *Seed & Berry*

ATTORNEYS

FIG_2

ROGER F. TURNBULL
SWAN CHRISTENSEN
GEORGE W. HERIGSTAD
INVENTORS.

BY

ATTORNEYS

ROGER F. TURNBULL
SWAN CHRISTENSEN
GEORGE W. HERIGSTAD
INVENTORS.

FIG_10

FIG_11

ROGER F. TURNBULL
SWAN CHRISTENSEN
GEORGE W. HERIGSTAD
INVENTORS.

BY

ATTORNEYS

April 25, 1967   R. F. TURNBULL ET AL   3,315,432
ROLL CRIMPING MACHINE

Filed March 13, 1964   7 Sheets-Sheet 7

FIG___12

FIG___13

ROGER F. TURNBULL
SWAN CHRISTENSEN
GEORGE W. HERIGSTAD
    *INVENTORS.*

BY *Seed & Berry*

ATTORNEYS

United States Patent Office 3,315,432
Patented Apr. 25, 1967

3,315,432
ROLL CRIMPING MACHINE
Roger F. Turnbull, Montesano, Swan Christensen, Hoquiam, and George W. Herigstad, Aberdeen, Wash., assignors to Lamb-Grays Harbor Co., Inc., Hoquiam, Wash., a corporation of Washington
Filed Mar. 13, 1964, Ser. No. 351,724
20 Claims. (Cl. 53—3)

The present invention relates generally to roll crimping machines and more particularly to a device for forming short folds or crimps in the protruding ends of a roll wrapper by means of movable crimper blades mounted on vertically disposed endless chains of a type commonly referred to a as Caterpillar tracks.

In the paper manufacturing industry, the common practice is to prepare the paper in long ribbons which are wound to form cylindrical rolls for storage and handling. It is also customary to wrap the rolls of paper with a protective wrapping in the form of a strip of paper wrapped about the cylindrical surface of the roll and protruding several inches from each end of the roll. The protective wrapping may be one or several plies depending upon the protection to be afforded. After the wrapper has been applied, the protruding ends are flattened against the ends of the roll by forming multiple crimps or folds about the peripheral edges of the roll. Following this operation, heavy paper discs are usually applied to the ends of the rolls and glued against the flattened crimps to complete the roll wrapper.

Until recent years, the crimping of the roll wrapper had to be done manually with a great expenditure of time and labor. Although mechanical devices have been developed for performing the crimping operation, difficulties have been encountered in developing a suitable device for handling a wide variety of roll diameters and roll lengths without major adjustments. Difficulty has also been encountered in providing a mechanical device for accomplishing the crimping operation with speed and efficiency while obtaining neat and even crimps or folds in the roll wrapper.

The main object of the present invention is to provide a new type of roll crimping device of the character described for accomplishing smooth and even crimping with minimum manual labor and attention regardless of the diameter of the roll.

Another object of the present invention is to provide a novel crimping structure capable of adjusting itself quickly and easily to any diameter or length of roll with minimum effort on the part of the operator.

Another object of the present invention is to provide a roll crimper device of the character described which can be used in combination with conventional roll wrapping machines.

Yet another object of the present invention is to provide a roll crimper of the character described for accomplishing the stated functions at a reduced cost.

A further object of the present invention is to provide a roll crimper wherein crimping shoes are mounted on vertically disposed endless chains and moved past each end of the roll in the vertical direction.

A further object of the present invention is to provide a roll crimper of the type described wherein the crimping shoe assembly can be selectively moved toward and away from the ends of the roll.

A still further object of the present invention is to provide a roll crimper device of the character described wherein the crimping shoes are held against the end of the roll with adjustable pneumatic pressure.

The means by which the foregoing objects and other advantages, which will be apparent to those skilled in the art, are accomplished, are set forth in the following specification and claims and are illustrated in the accompanying drawings dealing with the preferred embodiment of the invention.

Reference is now made to the accompanying drawings in which.

Figures 1, 6:
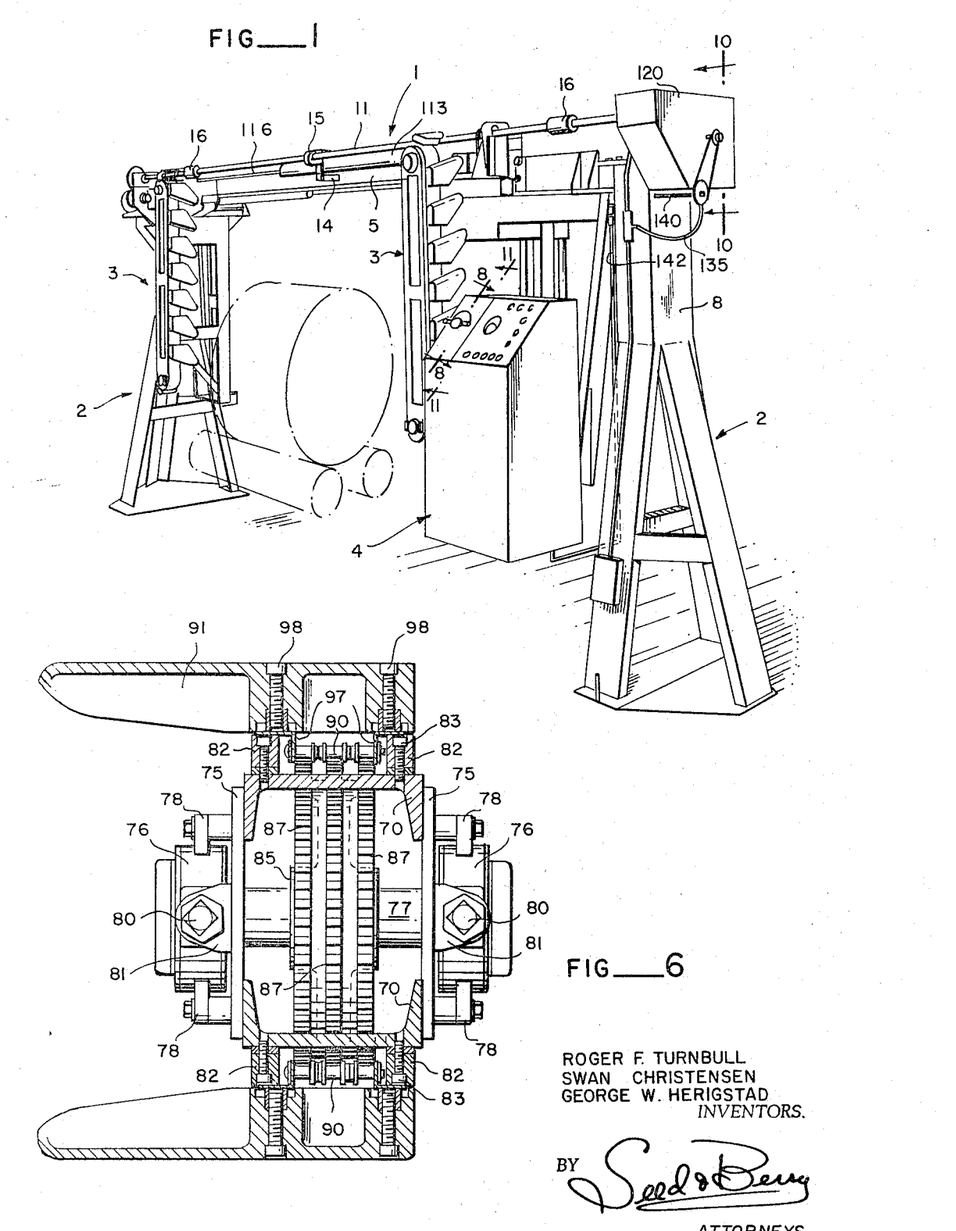
FIG. 1 is a perspective view of the overall crimper device.
FIG. 6 is a cros sectional view taken along lines 6—6 of FIG. 3.

Referring now to the drawings, wherein like reference numerals are used to indicate identical parts in the various views, the present device as illustrated in FIG. 1, generally includes an overhead track and crimper assembly support 1 supported by the upright end structures 2, crimper blade assemblies 3 and a control console 4.

The overhead track 1 may be constructed from any configuration of beam or beams such as the two channel beams 5 secured together by any suitable means to form a single support beam. A guide track 6 in the form of a flat plate member is secured beneath the beams 5 and extends the full length thereof. The guide track 6 may be welded or otherwise securely connected to the beams 5 and will include bearing surfaces 7 on both surfaces of both of its edges for a purpose to be described.

Figure 3:
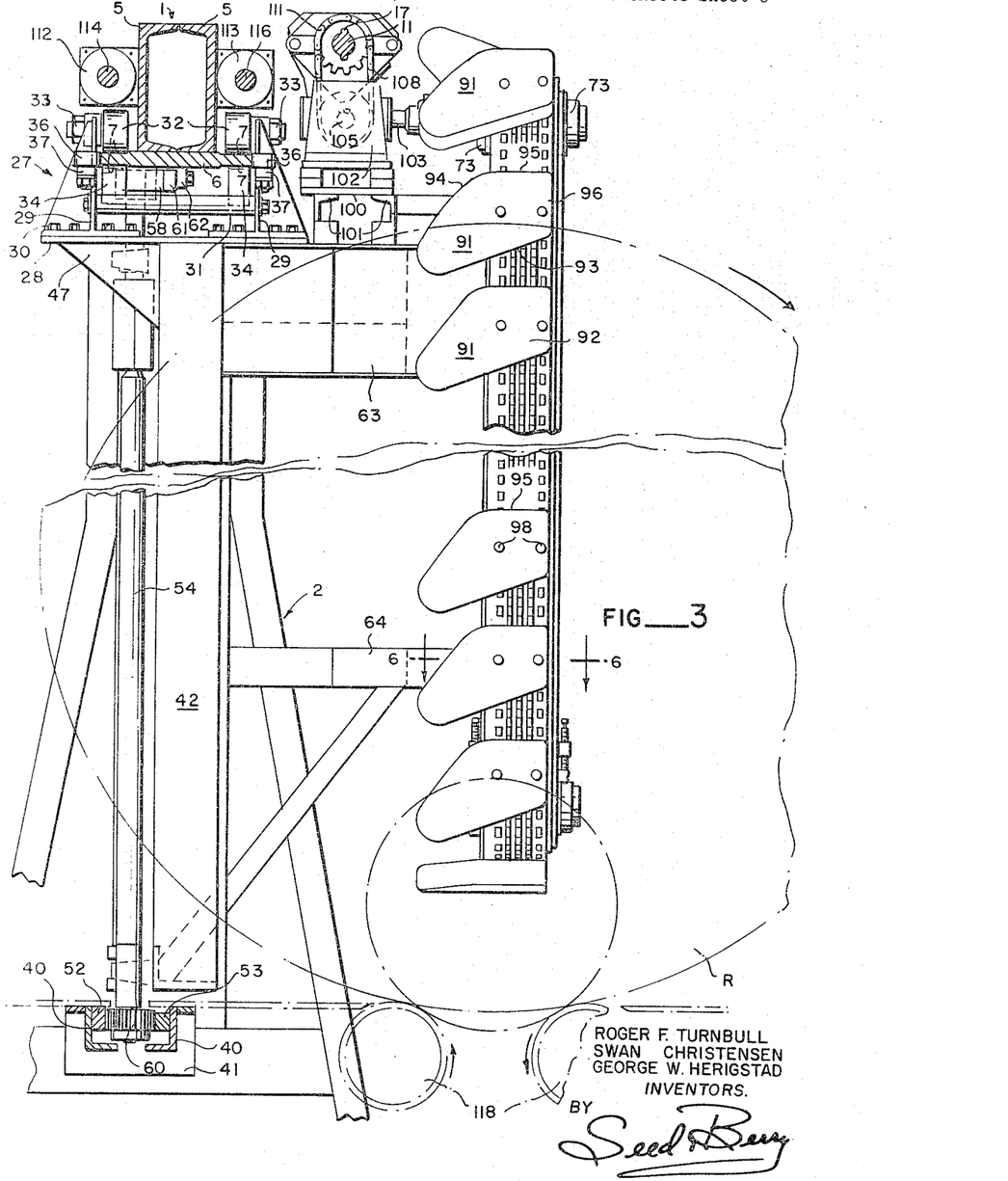
FIG. 3 is a cross sectional view taken along lines 3—3 of FIG. 2.

The composite structure of the beams 5 and track 6 is supported at each end by the upright end support structures 2. The support structures 2 may be identical or may be varied in any manner for the purpose of providing adequate support for the crimper blade assemblies carried by the overhead track 1. In the preferred embodiment shown in the drawings, each of the end structures 2 terminates in an upright channel iron or beam 8 with a horizontal support plate 9 welded or otherwise fixed thereto to receive a plurality of fastening bolts 10 for securing the guide track 6 thereto. As indicated in FIGS. 1 and 3, the end structures 2 normally rest at floor level somewhat below the level of the roll supporting conveyor or feeder means for moving the rolls to be wrapped between the crimper blade assemblies 3.

A main drive shaft 11 extends the full length of the beam 5 and is journaled for rotation at each end of the beams by means of bearings 12 carried by bearing plates 13. A central bearing bracket 14 is located along the length of the shaft 11 and is secured to one of the beams 5 and includes a support bearing 15 for maintaining the shaft 11 in alignment. The shaft 11 may include demountable repair couplings 16 to facilitate removal of the shaft. The central portion of the shaft 11 between the coupling 16 is provided with opposed splines or keys 17 for the purpose of driving the crimper assemblies in a manner to be described.

Figures 3A, 4, 5:
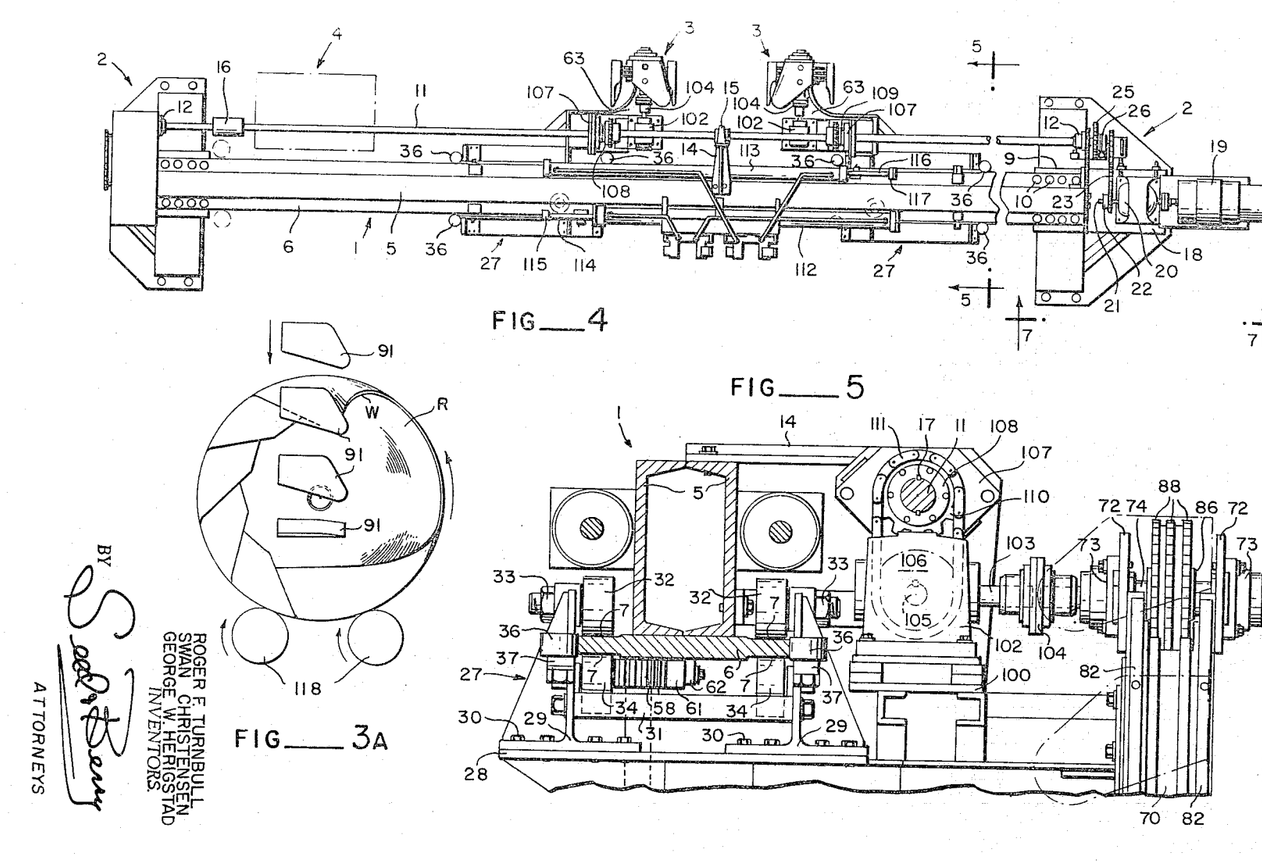
FIG. 3A is a partial schematic elevation showing the formation of crimps by the crimper blades.
FIG. 4 is a top plan view of the overall device.
FIG. 5 is a cross sectional view of the drive arrangement for one of the crimper blade assemblies taken along lines 5—5 of FIG. 4.
Figure 7:
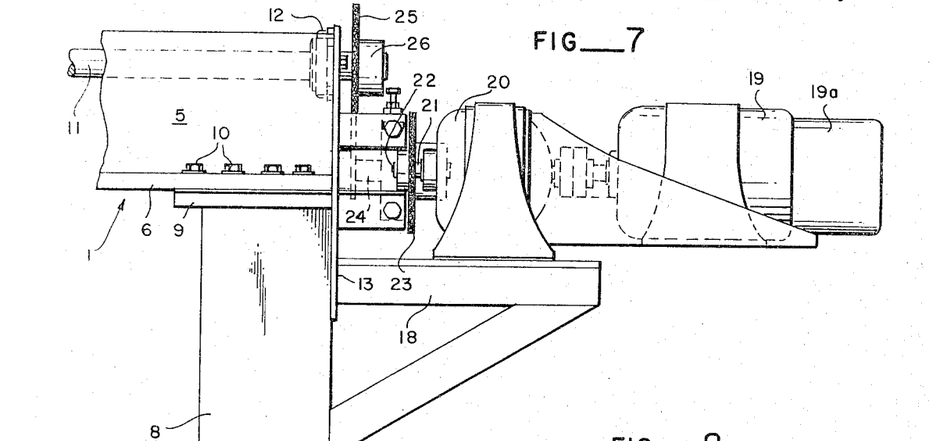
FIG. 7 is a detailed elevational view taken along the lines 7—7 of FIG. 4.

Mounted on the left hand support structure 2, as viewed in FIG. 1, is a a bracket 18 for supporting an electrical motor 19 and reduction gear unit 20 as shown in detail in FIGS. 4 and 7. The motor unit 19 may be either an "on-off" electrical motor with a brake 19a for obtaining immediate halting of the upright shaft upon deenergization, or in the alternative, comprise a motor and clutch unit wherein the motor runs continuously and the clutch may be selectively engaged and disengaged. The output shaft 21 of the gear unit 20 is keyed to rotate a sprocket 22, which drives a chain 23 trained about another sprocket, not shown, keyed to the idler shaft 24. The idler shaft 24 also carries a suitable sprocket, not shown, for driving the chain 25 trained about the sprocket 26 keyed to the right end of the drive shaft 11 as viewed in FIG. 4.

The crimper blade assemblies indicated generally at 3 are substantially identical in details of structure and are mirror images of each other to provide a right hand and left hand crimper blade assembly with reference to FIG. 1. Since these assemblies are substantially identical, only the right crimper blade assembly is illustrated in detail in FIGS. 2 and 3 and it will be understood that the following description of these structural details will also apply to the left hand crimper blade assembly.

Figure 2:
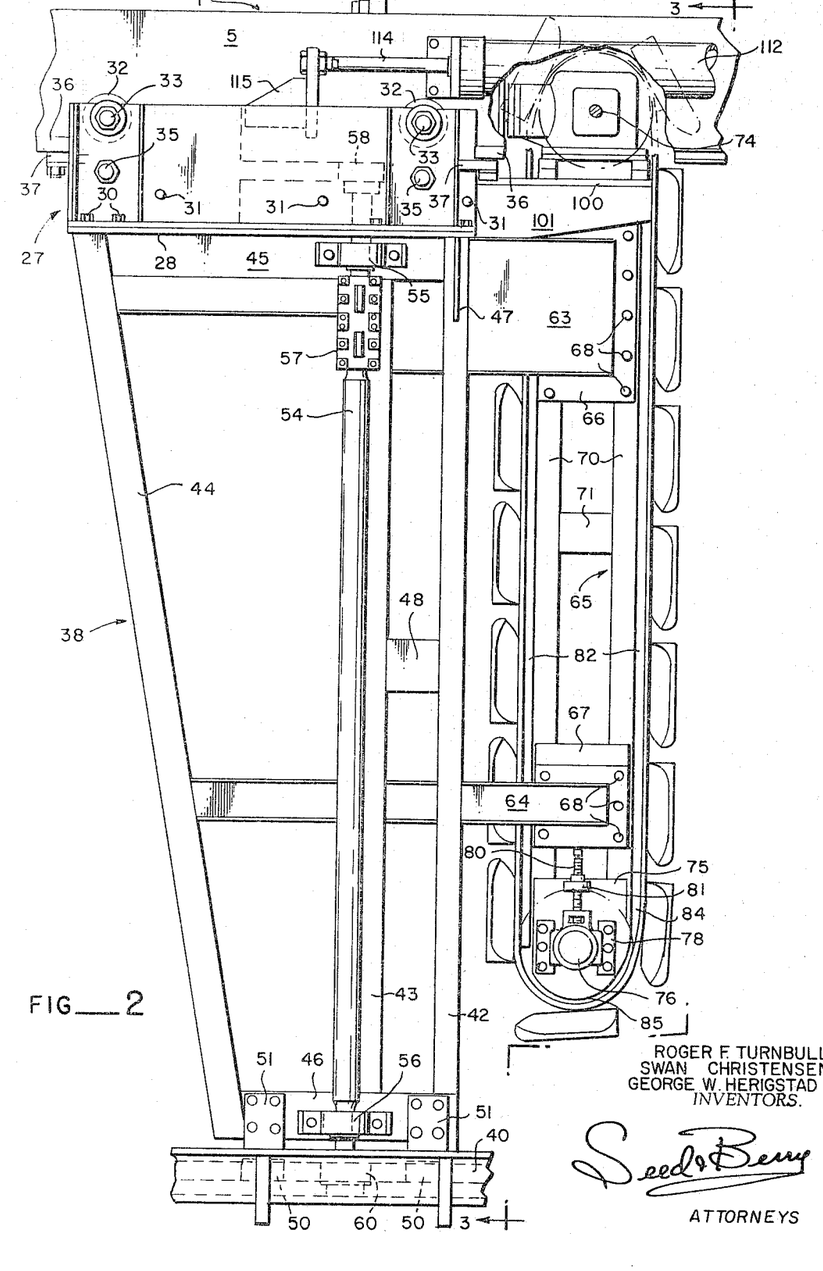
FIG. 2 is a back elevational view of one of the crimper blade assemblies.

Each crimper blade assembly is mounted for reciprocation along the guide track 6 by means of a carriage indicated generally at 27. The carriage is comprised of a flat base plate 28 and spaced vertical side plates 29 affixed thereto by means of bolts 30. In order to strengthen the upright side plates 29, a plurality of spacer members 31 may be located therebetween. Four identical top rollers 32 are mounted on the carriage with a top roller being rotatively mounted at each end of each of the side plates 29 by means of bolts or the like 33. An identical set of four bottom rollers 34, secured to the side plates by means of bolts 35 is also provided with a roller 34 being positioned directly beneath each top roller 32 as illustrated in the drawings. The top and bottom sets of rollers engage the top and bottom surfaces of each side of the guide track 6 to facilitate the positioning of the carriage 27 and to prevent vertical movement of the carriage. In order to prevent lateral displacement of the carriage 27 as it moves along the track 6, each side plate 29 also mounts guide rollers 36 carried by brackets 37 fixed to the side plates. The guide rollers 36 are rotatable about vertical axes and engage the side edge of the guide track 6.

A depending frame indicated generally at 38 in FIG. 2 is fixed to the bottom of the base plate 28 and extends downwardly to a position closely adjacent a stabilizer guideway 40 mounted in the support platform 41 for supporting the rolls to be crimped. The general plane of the frame 38 is vertical and parallel to the longitudinal axis of the beams 5. The frame 38 may consist of two vertical channel members 42 and 43, and inclined channel member 44 with top and bottom horizontal braces 45 and 46, respectively. In order to further rigidify the frame 38, a gusset 47 and brace 48 may be provided. Identical rollers 50 are carried on brackets 51 attached to the bottom brace 46 by any suitable means such as bolts or the like. The rollers 50 engage the guide surface 52 of the track 40, a second guide surface 53 is also provided which is in the form of a rack having gear teeth for a purpose later to be described. With this arrangement, the reciprocation of the carriage 27 is stabilized in a vertical plane by its roller contact with the guide plate 6 and the stabilizer guide 40.

In order to provide for even and vertical travel of the frame 38 along the overhead track, a stabilizer shaft 54 is journaled for rotation on the frame 38 by means of the bearing blocks 55 and 56 fixed to the top and bottom braces 45 and 46, respectively, with a repair bearing 57 being provided for the shaft to facilitates demounting. The stabilizer shaft 54 also includes spur gears 58 and 60 on its opposite ends with the teeth of the spur gear 58 meshing with teeth of a rack 61 fixed to the underside of the guide track 6 and the teeth of the spur gear 60 meshing with the teeth on the guide surface 53 of the guide 40. The rack 61 may be secured to the under-side of the track 6 by any means such as the bracket 62. Thus, as the carriage 27 moves along the overhead track, the shaft 54 insures even travel of the frame 38 and prevents binding or tilting of the frame 38 because of the weight of the crimper blade assembly carried thereby.

The crimper blade assemblies 3 are supported from the frames 38 by means of an upper support beam 63 and a lower support beam 64. The beams 63 and 64 may be of any cross sectional configuration to insure adequate strength and are connected to the frame 38 by any desired means such as welding, bolting or the like and may be reinforced by any arrangement of braces to insure stability. The beams 63 and 64 are secured to the crimper assembly frame 65 by means of the end plates 66 and 67 respectively by any desirable means such as the bolts 68. The crimper assembly 65 is thus held rigid with the movable stabilizer frame 38.

In detail, the crimper assembly frame 65 comprises two parallel U-shaped channel members 70 with a spacer 71 secured therebetween. The stationary bearing plates 72, shown in FIG. 5, are fixed between the upper ends of the channel members 70 for mounting the stationary bearing assemblies 73 which provide a journal for the shaft 74 which drives the blade members in a manner to be described. A second set of bearing plates 75 is secured between the bottom ends of the channel member 70 and provide an adjustable mounting means for the movable bearing assemblies 76 which journal a rotatable idler shaft 77. The bearing assemblies 76 are mounted for vertical sliding movement between guide bars 78 carried by the plates 75 as illustrated in FIGS. 2 and 6. Adjusting screws 80 are attached to the bearing assemblies 76 and are threadably received by the brackets 81 carried by each of the plates 75. With this structure, the idler shaft 77 may be vertically adjusted with relation to the shaft 74 journaled at the top end of the bearing assembly frame. It will also be noted, as shown in FIG. 2, that the axis of the idler shaft 77 is laterally offset from the axis of the upper shaft 74.

Each edge of each of the channel members 70 is equipped with an elongated guide strip 82 secured to the channel member by means of screws or the like 83. The function of the guide strips 82 is to provide a wear surface for the travel of the crimper blades as will be explained. It will also be noted that the bottom end of the right hand guide strips 82 are tapered as indicated at 84 in FIG. 2 to provide a smooth transition from the vertical straight edge of the strips into the periphery of the sprocket wheel 85 keyed to the shaft 77. The guide strips 82 on the left or opposite side of the crimper assembly frame as shown in FIG. 2 are reversed so as to have a tapered portion, not shown, to provide a smooth transition into the periphery of an upper sprocket wheel 86 keyed to the shaft 74 at the top of the spring 65. The sprocket 85 is equipped with three individual sets of sprocket teeth 87 and the upper sprocket 86 is likewise provided with three individual sets of sprocket teeth 88 which are in vertical alignment with the sprocket teeth 87 for the purpose of driving a wide track endless chain 90 thereabout and vertically along the guide strips 82.

Although the members 90 are illustrated as chains and will be described as such in the preferred embodiment, it will be undestood that other types of endless conveyor devices may be substituted for the chains shown without departing from the scope of the invention.

Each chain 90 of the crimper blade assembly is provided with evenly spaced crimper blade elements 91 over its entire length. The blades 91 on the right and left hand blade assemblies 3 are necessary right and left hand blades or mirror images of one another so as to perform the identical crimping function on each side of a roll placed between the crimper assemblies. The blades 91 may be formed from any suitable material with cast aluminum being preferred and, in order to give an extremely smooth and durable surface, the blades may be sprayed with Teflon or the like. As viewed in FIG. 3, each blade 91 has a flat face 92 which is rounded into an inclined bottom edge 93 which is curved into an oppositely inclined side edge 94. A straight top edge 95 is curved into the incline side edge 94 and a straight side edge 96 is provided opposite the side 94. It is preferable, of course, that all edges bordering the face 92 of the blade be rounded in order to prevent tearing of the paper being crimped. The blades are so arranged on each of the assemblies 3 that the blades contact the roll to be crimped with the rounded and inclined bottom edge 93 and side edge 94 being the leading edges and with the blades extending away from the chain mounting in a direction opposite from the direction of rotation of a roll being crimped as illustrated by the directional arrows in FIGS. 3 and 3A. The blades 91 are attached to the chains 90 by means of clips 97 secured to each side of the chain and spaced at intervals and fixed to the blades 91 by means of bolts 98. The clips 97 are angular in form with one leg being attached to the chain 90 and the opposite leg being fixed to the back side of the blade 91 as shown in detail in FIG. 6. The back sides of the clips 97 ride along the surfaces of the guide strips 82 as the chain 90 is moved about the sprockets 85 and 86. Thus, with the offsetting of the axis of the sprocket 85 from the axis of the sprocket 86, and with the tapering 84 of the opposite ends of the guide strips 82 on both sides of the assembly, the blades travel vertically on each side of the assembly but are caused to diverge away from the end of the roll being crimped as they near the bottom of the assembly 65. This divergence allows for the leading bottom edges of the blades to clear the crimps on the bottom of the roll and also allows room for the trailing edges of the blades to kick outwardly as they are drawn around the bottom sprocket 85.

As mentioned before, the drive for operating the crimper blades is taken from the main drive shaft 11 carried adjacent the overhead beams 5. The upper support beams 63 on each of the crimper assemblies carries a platform 100 which may be supported by any suitable means such as the angle irons 101. Stationary with the platform 100 is a drive transfer unit 102 having a drive output shaft 103 connected to drive the shaft 74 by means of a demountable coupling 104. The unit 102 also includes an input shaft 105 at right angles to the shaft 103 and a sprocket 106 keyed to the input shaft 105. Also fixed to the platform 100 is a stationary bearing block 107 which provides a bearing for the rotatable sprocket sleeve 108 which slidably and drivingly engages the double splined main drive shaft 11. The splines 17 on the shaft 11 allow the sprocket sleeve 108 to reciprocate relative to the shaft 11 during rotation of the shaft to permit the crimper assemblies to be moved along the overhead support track during their operation. The sprocket sleeve 108 may, of course, rotate relative to the bearing block 107 but is prevented from displacement therefrom. The sprocket sleeve 108 carries a sprocket 110 which drives the chain 111 to in turn drive the sprocket 106 on the input shaft 105 of the transfer unit 102. In this manner, rotation may be imparted to the crimper blade assemblies at any time during their movement along the overhead track.

The crimper assemblies 3 are moved toward and away from each other along the guide track 6 by means of fluid power cylinders 112 and 113 fixed to the sides of the overhead beams 5 as illustrated most clearly in FIGS. 2, 3 and 4. The cylinder 112 has a piston rod 114 connected to the right hand crimper assembly by means of the bracket 115 and the power cylinder 113 has a piston rod 116 connected to the carriage of the left hand crimper assembly by means of a bracket 117. The fluid cylinders 112 and 113 are double acting pneumatic cylinders in the preferred form of the invention and their respective piston rods are extended and retracted to move the crimper blade assemblies in and out by use of the pneumatic control system illustrated schematically in FIG. 12 the operation of which will be explained in detail in connection with the electrical control circuit illustrated in FIG. 13.

During the crimping operation, a paper roll is moved to a position between the open crimper blade assemblies 3 and is supported there by means of the wrapping rolls 118 shown in FIG. 3 which are rotated by any suitable means, not shown, for the purpose of rotating the paper roll R in position in the clockwise direction as viewed in FIG. 3. The paper wrapper is put on the roll when it is in position as shown in FIG. 3 by any conventional roll wrapping device, the details of which form no part of the present invention and hence are not illustrated. The present crimping device operates only after the wrapper has been placed on the roll and the ends are ready for crimping. The roll R, with the wrapper thereon, is caused to rotate continuously by the wrapper rolls 118 during the crimping operation. After the roll is in position, operation of the crimping device of the present invention is initiated and, with the crimper blades 91 in motion so that the blades facing each other move in a downward direction, the crimper assemblies 3 are moved inwardly to contact the ends of the roll R to be crimped. The combined action of the downwardly moving blades 91 and the rotation of the roll R accomplishes the crimping operation as will be explained in detail later with reference to FIG. 3A. The motion of the blades 91 is a stepping motion with a predetermined dwell being provided between each increment of movement of the blades. As will be understood by those skilled in the art, the dwell between the increments of movement of the blades must be increased or decreased according to the diameter of the roll being crimped. Thus, the larger the diameter of the roll being crimped, the longer the dwell between increments of movement of the blades must be. The time of dwell between the movement of the blades actually determines the size of the crimp or fold in the wrapper and hence a roll of a given diameter requires a given dwell between increments of movement of the blades in order to produce the correct number and size of crimps to correspond with its circumference. The problem then becomes one of controlling the time dwell between incremental movements of the blades according to the diameter of the paper roll being crimped. As aforementioned, the drive for rotating the crimper blades is obtained from the main drive shaft 11 which is powered by an "on-off" electrical motor 19 or, in the alternative, a motor and clutch arrangement. Thus the timing for the activation and deactivation of the motor 19 must be controlled according to the diameter of the roll being crimped by the mechanism now to be described.

In the pereferred form, there is a one-to-one relation between the main drive shaft 11 and the blade sprockets 86 such that one revolution of the drive shaft also moves the sprockets 86 one revolution. The blades 91 have a 9-inch pitch, i.e. corresponding points on adjacent blades are 9 inches apart, and the circumference of the sprockets 86 is 27 inches. Thus one revolution of the sprocket 86 moves any given blade a distance equal to 3 times the pitch distance or, as otherwise stated, the distance of 3 blades.

Figure 9:
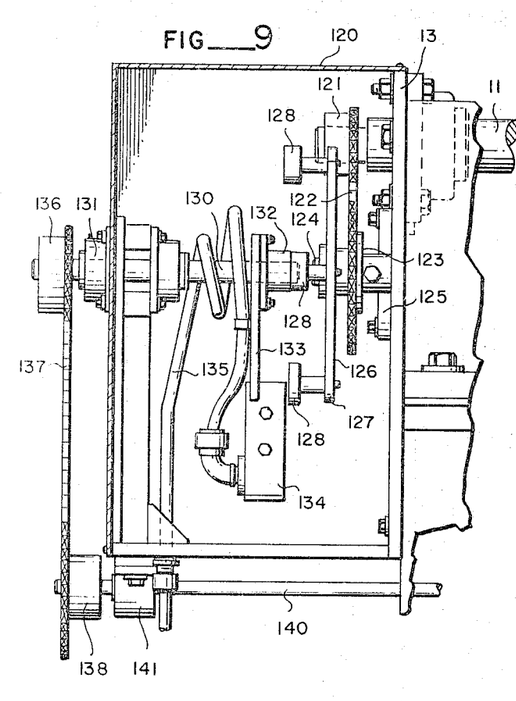
FIG. 9 is a cross sectional view taken along lines 9—9 of FIG. 10.

Along with the dwell time between increments of movement of the crimper blades, the position at which any given blade is halted is also important and is dependent upon the diameter of the roll being crimped. To accomplish the function of halting the blades at the proper point for a given roll diameter, a housing 120 is located at the end of the beam 5 and provides an enclosure for a sprocket 121 keyed to the end of the shaft 11 remove from the motor 19 with the sprocket 121 being provided with a chain 122 for driving a second sprocket 123 keyed to the stub shaft 124 journaled for rotation in a bearing 125 mounted on the end plates 13 as illustrated in FIG. 9. Also keyed to rotate with the shaft 124 is a spider wheel 126 having six equally spaced arms 127 located about its periphery. Each of the arms 127 is provided with a proximity switch actuator or lobe 128. The spider wheel 126 is driven by the main power shaft 11 with a ratio of 1 to 2, i.e. one revolution of the shaft 11 results in one-half revolution of the spider wheel 126.

Figure 8:
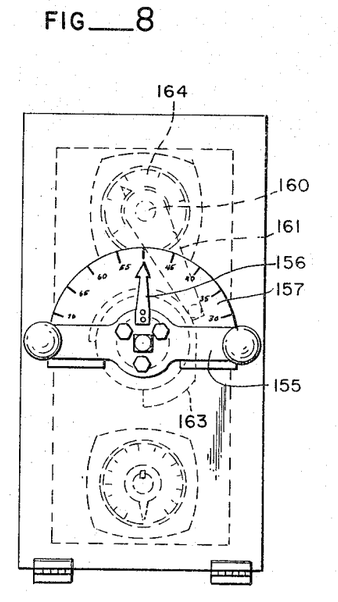
FIG. 8 is a detailed elevational view taken along lines 8—8 of FIG. 1.
Figure 10:
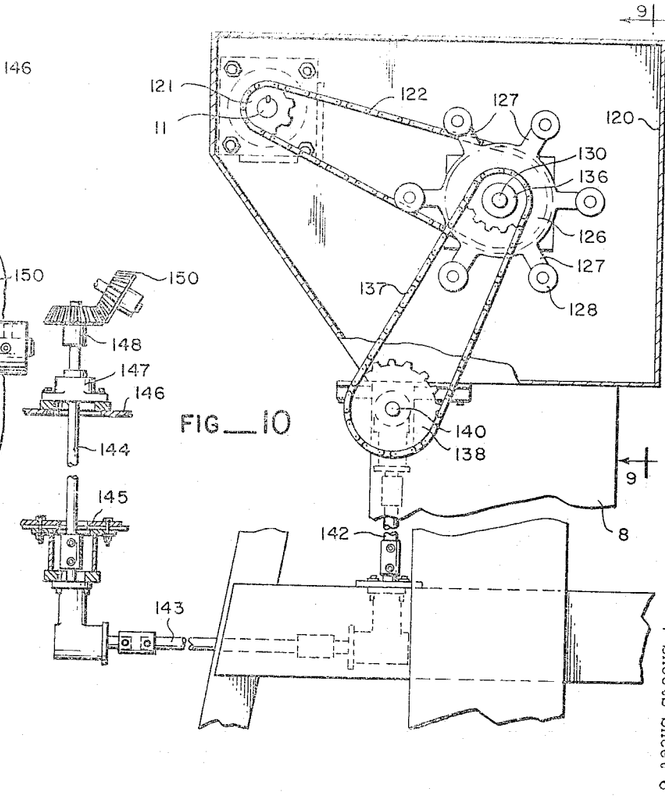
FIG. 10 is an elevational view taken along lines 10—10 of FIG. 1 with an end plate removed.
Figure 11:
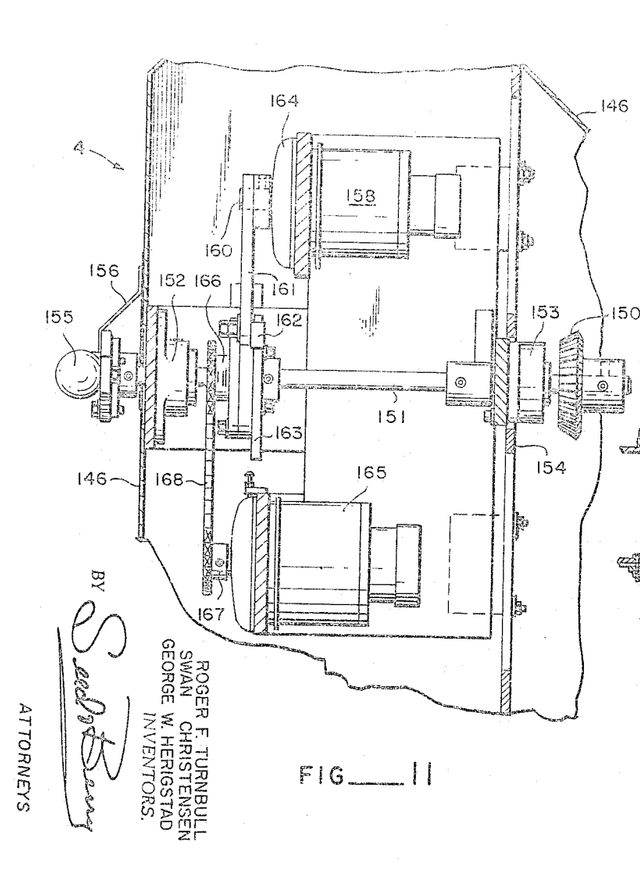
FIG. 11 is a cross sectional view taken along lines 11—11 of FIG. 1.

A rotatable positioning shaft 130 is journaled in the wall of the housing 120 by means of a suitable bearing 131 and is positioned to be coaxial with the shaft 124 as shown in FIGS. 9 and 10. The shaft 130 has fixed thereto a hub 132 which carries an arm 133 for mounting a conventional proximity switch 134 located adjacent the path of the rotating switch actuators 128. This relationship is shown clearly in FIG. 9. The rotational position of the switch 134 may be adjusted by rotating the shaft 130 and the switch is connected by means of an electrical conduit 135 to the electrical circuit for the "on-off" motor 19 and serves to break the circuit to the motor when any one of the switch actuators 128 moves into proximity as will be later described in connection with FIG. 13. Means for adjusting the position of the shaft 130 and consequently the rotational position of the switch 134 are provided by way of a sprocket 136 keyed to the shaft 130, a chain 137, a sprocket 138 keyed to the rotatable shaft 140 mounted in the bearings 141 fixed to the bottom of a housing 120. The shaft 140 has a driving connection to the vertical shaft 142, extending downwardly along the end support member 2, the horizontal shaft 143, and the vertical shaft 144, which extends upwardly through the existing floor structure 145 and through any convenient location on the housing 146 of the console 4. The shaft 144 may be journaled in any suitable bearing 147 carried by the housing 146 and includes a bevel gear 148 on its terminal end which meshes with a bevel gear 150 as shown in FIG. 10. The bevel gear 150 is fixed to a shaft 151 journaled in the bearings 152 and 153 carried by a front portion of the housing 146 and a support plate 154 within the housing respectively. This relationship is shown in FIG. 11 with the view being turned to the vertical for ease of understanding. As also shown in FIGS. 8 and 11, the end of the shaft 151 opposite the bevel gear 150 is provided with a ball handle control arm 155 which is fixed to shaft 151 and provides a means for manually rotating shaft. The handle 155 includes an indexing pointer 156 for selecting a given roll diameter size indicated on a dial face 157 mounted on the control board of the console 4. An operator may thus control the position of the proximity switch 134 by manually rotating the ball handle 155 to locate the indicator 156 at a given diameter dimension on the dial 157.

The positioning of the proximity switch 134 directly controls the position at which any given blade 91 will be halted as follows. As mentioned, one complete revolution of the shaft 11 moves any given blade 3 pitch distances. As also mentioned, one revolution of the shaft 11 moves the spider wheel 126 only one-half revolution which would bring three successive switch actuators 128 in proximity with the switch 134. It may thus be seen that any given blade will be only allowed to move only one pitch distance before it is stopped by the action of a switch actuator 128 moving into proximity with the switch 134 which serves to stop the motor 19. It may also be seen that if the proximity switch 134 is moved by rotating the handle 145 on the console, the position at which any given blade will be stopped is altered. With the diameter setting on the dial 157 being correlated to different stop positions of the blades, depending upon the diameter of the roll being crimped, the blades may be set to stop at the given position for the roll diameter selected.

Since the proximity switch 134 serves only to break the electrical circuit to the motor 19 and halt the shaft 11, means are provided for switching the motor on again after a predetermined dwell dependent upon the diameter of the roll being crimped. This function is accomplished by means of a timer switch mechanism 158 mounted in the console 4 which is electrically connected to the motor 19 to complete a circuit through the motor a predetermined time interval after the motor has been shut off by the switch 134 in a manner to be described. The timer 158 may be set for a given number of seconds corresponding to the diameter of the roll being crimped by means of control shaft 160, the position of which is set by a control arm 161 having a roller cam follower 162 mounted on a lower end as viewed in FIG. 11. The roller 162 follows the cam surface 163 the position of which is determined by the rotational position of the shaft 151. The cam 163 is so constructed that a given diameter selection on the dial 157 will set the timer 158 to control the number of seconds of dwell corresponding to the particular diameter selection. If it is desired, a visual dial 164 may be provided to allow visual inspection of the timer setting.

It may also be desirable in some cases to control the length of the roll wrapper applied as a function of the diameter of the roll. In this case, a sheet length timer 165 may also be set concurrently with the selection of the roll diameter setting on the dial 157 by means of a sprocket 166 fixed to the shaft 161 and connected to a control sprocket 167 on the timer 165 by means of a chain 168.

Referring now specifically to FIG. 3A, the view shown is a schematic elevation looking toward either end of a roll being crimped from a position in back of the crimper blades. The paper roll R is constantly rotated about its own axis by means of the wrapper rolls 118 in a counter clockwise direction as indicated by the arrow. The paper roll R has been previously provided with a wrapper W which extends several inches beyond each end of the cylindrical paper roll. The individual crimper blades 91 are being moved vertically downwardly with the stepping motion previously described as indicated by the arrow and have been moved into contact with the ends of the rolls and held thereagainst with slight pressure. As each blade is moved downwardly it is caused to halt a distance of approximately 1 inch below the upper periphery of the roll R as determined by the position of the proximity switch 134 previously described. The blade remains stationary for a predetermined number of seconds controlled by the timer 158. As will be understood by those skilled in the art, the downward movement of the blade creases the roll wrapper at the edge of the roll and the amount of pressure exerted by the blades against the end of the roll is adjusted to cause a definite creasing of the wrapper overhang along the periphery of the roll. Since the roll R is rotating during this time, the wrapper overhang is caused to curve outwardly from beneath the contacting blade 91 and into the uncrimped portion of the wrapper overhang. After the time dwell has elapsed, the next succeeding blade 91 is moved downwardly over the curved portion of the wrapper forming a sharp crease or crimp and repeating the action of the first contacting blade in preparation for the next succeeding blade to form the next crimp. This process continues until the entire wrapper overhang has been evenly crimped. Since the roll R and the crimper blades 91 are moving at uniform speed, and the proximity switch 134 and dwell timer 158 have been preset according to the diameter of the roll R, the crimps will be uniform in size and spacing over the circumference of the roll.

Figure 12:
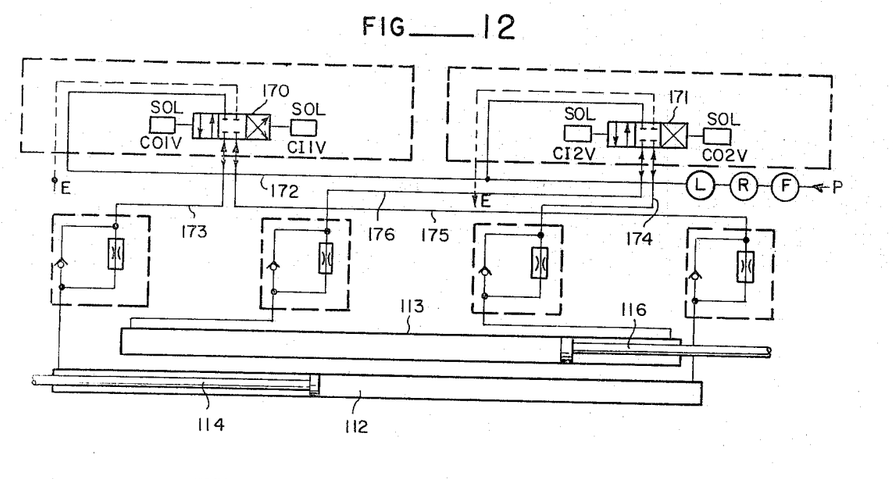
FIG. 12 is a schematic of the pneumatic controls for the crimper assemblies.
Figure 13:
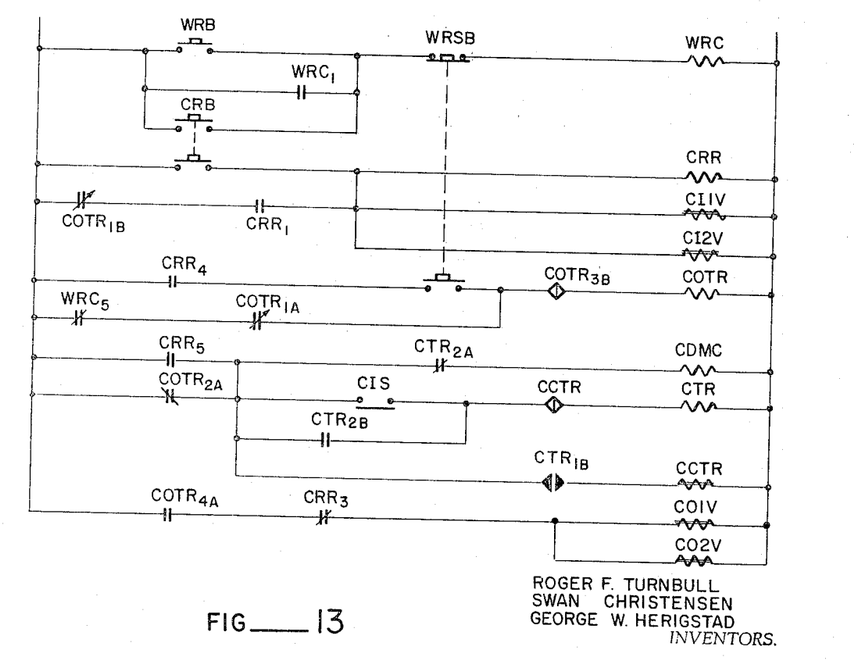
FIG. 13 is a schematic of the electrical controls for the crimper device.

Turning now to the pneumatic system and the electrical control circuit, reference is made to FIGS. 12 and 13 respectively for an understanding of the overall operation of the device. At the beginning of the operation, it will be understood that the crimper assemblies 3 are in the open position as shown in FIG. 1 and the motor 19 is not yet energized. The wrapper roll button WRB has been closed so as to energize the wrapper roll relay WRC through the normally closed contacts of the switch WRSB. The relay WRC is locked in or maintained in the energized condition by one of its contacts WRC1 so as to cause continual rotation of the wrapper rolls 118. The operator now presses the crimper run button CRB which energizes the crimper run relay CRR one contact of which energizes the motor 19 initiating movement of the crimper blades 91. The switch CRB returns to its normally open position once released.

A normally open contact CRR1 of the crimper run relay closes to energize the crimper-in-valve solenoids CI1V and CI2V respectively and also locks in the crimper run relay CRR to keep the motor 19 running. As seen in FIG. 12, energization of the solenoids CI1V and CI2V moves the normally centered valves 170 and 171 to the first open position allowing air pressure from the line 172 to be exerted on the rod ends of the cylinders 112 and 113 respectively through the cylinder conduits 173 and 174 respectively. The crimper assemblies 3 are thus caused to move inwardly toward the roll being crimped with the crimper blades in motion. Another contact CRR3 of the crimper run relay which is normally closed opens at this time to prevent energization of the crimper-out-valve solenoids CO1V and CO2V, thus insuring that air pressure is maintained on the crimper assemblies in the "in" direction. The contact CRR5 of the crimper run relay has closed to energize the crimper motor contact CDMC which energized the motor 19. The contact CRR4 has also been closed to condition a circuit later to be described.

The crimper motor 19 will continue to run until the contacts CIS of the proximity switch 134 are closed by one of the switch actuators 128 shown in FIG. 10. Closing of the contact CIS energizes the crimper time relay CTR. On energization of a crimper time relay, its contact CTR2A opens breaking the circuit to the crimper motor contacts CDMC to stop the crimper motor 19 which is immediately braked by its associated braking device 19a. Another contact CTR2B closes locking in the relay CTR and contact CTR1B closes after a slight delay bringing in the crimper cycle time relay CCTR of the timing device 158 to control the crimper blades 92. After the time cycle relay CCTR times out, CTR2A again closes starting the motor again through the contact CDMC. Timing out of the cycle relay CCTR also opens CTR2B deenergizing the relay CTR and conditioning the proximity switch contacts CIS to again control the CTR. CTR1B deenergizes the crimper cycle time relay CCTR. The operation thus described repeats to continue the indexing of the crimper blades 91 until all of the crimps on a particular roll are made and the operator desires to move the crimper blade assembly 3 outward.

After all of the crimps are made in the roll wrapper, the operator presses the wrapper roll stop button WRSB which breaks the circuit to the wrapping roll contacts WRC to stop the motion of the wrapping rolls 118. The closing of the button WRSB also energizes the crimper out time relay COTR which may be pneumatically operated and is designed to deenergize or open after a time delay. The crimper out time relay COTR may be set for any desired time intervals and controls the extent of the outward movement of the crimper assemblies 3 away from the roll after the crimping has been completed in the following manner. Initially upon energizing COTR, contact COTR3B which is normally closed opens and COTR4A closes to energize crimper-out-valve solenoids CO1V and CO2V respectively at which time COTR1B opens dropping out the crimper run relay CRR returning its contacts to normal thus again closing CRR3 and opening CRR1 to deenergize the crimper-in-valve solenoids CI1V and CI2V. The contact CRR5 of the crimper run relay also opens to stop the motor 19 through its contacts CDMC. Deenergization of the crimper-out-valve solenoids and energization of the crimper-out-valve solenoids as shown in FIG. 12 admits air pressure from the lines 172 to the cylinders 112 and 113 through the conduits 175 and 176 respectively and exhausts the opposite ends of the cylinders through the conduits 173 and 174 thus moving the piston rods 115 and 116 outwardly resulting in outward movement of the crimper blade assemblies.

The outward movement of the crimper blade assemblies will continue until the crimper out time relay COTR times out at which time the contact COTR4 will open to deenergize the crimper-out-valve solenoids CO1V and CO2V to return the valves 170 and 171 to their centered position halting further movement of the assemblies. Contact COTR3B then closes to its normal position ready for the next cycle of operation. The purpose of the contact COTR1A is to initially maintain current to the crimper out time relay COTR in the event that the operator fails to hold the wrapper roll stop button WRSC long enough and the contact COTR2A serves to maintain the crimper cycle time relay CCTR in circuit until it has finished its timing cycle and then again opens after the relay COTR has timed out. Any desired means may be utilized to remove the crimped roll from the rollers 118 and to move the next roll to be wrapped and crimped into position. It will also be understood that modifications of the electrical circuit thus described may be accomplished without departing from the scope of the invention and that safety switches or emergency stops may be added to the circuit as they are deemed necessary.

It will be readily apparent to those skilled in the art that the present invention provides significant improvements in roll crimping devices of the character described. The arrangement and types of structural components utilized in this invention is subject to numerous modifications well within the purview of this invention and applicant intends to be limited only to a liberal interpretation of the specification and appended claims.

Having thus described the invention, what is claimed as new and desired to be secured by Letters Patent is:

1. A device for crimping the protruding ends of a roll wrapper comprising in combination; means to rotate said roll, a plurality of vertically spaced crimper blades located adjacent the ends of said roll, means to support said blades for movement into contact with the ends of said roll, and means to impart intermittent downward vertical movement to said blades for forming successive crimps in said wrapper ends.

2. A roll crimper for crimping the protruding end of a roll wrapper comprising in combination, means for rotating said roll about a fixed axis, a plurality of crimper blades, means for mounting said blades in vertical spaced relation in contact with the end of said roll, and means to move said blades vertically downwardly with intermittent motion to form successive crimps in said wrapper end.

3. A device for crimping the protruding ends of a roll wrapper comprising in combination; means for rotating said roll about its axis, first and second crimper assemblies located adjacent opposite ends of said roll, support means for supporting said assemblies for reciprocative movement toward and away from said roll, each of said assemblies including a plurality of spaced crimper blades, means to mount said blades for vertical downward movement adjacent the ends of said roll, means connected to said blades for imparting intermittent movement in the downward direction, and means carried by said support means for selectively moving said assemblies into contact with the ends of said roll for crimping the wrapper ends by the combined motion of said blades and said roll.

4. The combination according to claim 3 wherein, said means for imparting intermittent movement to said blades includes; an electrical motor and a drive shaft drivingly connected to said blades, switch means for breaking the electrical circuit to said motor in the closed position, timer means responsive to the closing of said switch means for completing the circuit to said motor a predetermined time interval after the closing of said switch means, and control means responsive to the movement of said drive shaft through a predetermined angle of rotation for closing said switch means.

5. The combination according to claim 4 including means to selectively condition said switch means to vary the position of rotation of said main drive shaft at which said switch means is closed and to vary the interval of said timer means according to the diameter of the roll being crimped.

6. A device for crimping the protruding end of a roll wrapper comprising in combination; means for rotating said roll about its axis, a crimper assembly located adjacent the end of said roll, support means for supporting said assembly for reciprocation toward and away from said roll, said assembly including a plurality of spaced crimper blades, means to mount said blades for vertical downward movement adjacent the end of said roll, means connected with said blades for imparting intermittent movement in the downward direction, and means carried by said support means for selectively moving said assembly into contact with the end of said roll for crimping the wrapper end by the combined motion of said blades and said roll.

7. The combination according to claim 6 wherein, said means for imparting intermittent movement to said blades includes; an electrical motor and a drive shaft drivingly connected to said blades, switch means for breaking the electrical circuit to said motor in the closed position, timer means responsive to the closing of said switch means for completing the circuit to said motor a predetermined time interval after the closing of said switch means, and control means responsive to the movement of said drive shaft through a predetermined angle of rotation for closing said switch means.

8. The combination according to claim 7 including means to selectively condition said switch means to vary the position of rotation of said main drive shaft at which said switch means is closed and to vary the interval of said timer means according to the diameter of the roll being crimped.

9. A device for crimping the protruding ends of a roll wrapper comprising; means for rotating said roll about a fixed axis, first and second crimper assemblies positioned adjacent the opposite ends of said roll, track means extending laterally from each end of said roll and spaced therefrom, means for mounting said assemblies for reciprocative movement along said track, each of said assemblies including a vertically disposed endless conveyor member, rotatable drive means carried by said assemblies for moving a portion of each of said conveyor members vertically downwardly adjacent the ends of said roll, a plurality of blades fixed to each of said conveyor members, means for imparting intermittent rotation to said drive means, and means carried by said track for moving said assemblies into contact with the ends of said roll, whereby the combined motion of said blades and said roll cause crimping of said wrapper ends.

10. The combination according to claim 9 wherein, said means for imparting intermittent rotation to said drive means comprises; an electrical motor and a main drive shaft carried by said track and drivingly connected to said rotatable drive means, switch means for breaking the electrical circuit to said motor, timer means responsive to the closing of said switch means for completing the circuit to said motor a predetermined time interval after the closing of said switch means, and control means responsive to the movement of said main drive shaft through a predetermined angle of rotation for closing said switch means.

11. The combination according to claim 10 including means to selectively condition said switch means to vary the position of rotation of said main drive shaft at which said switch means is closed and to vary the interval of said timer means according to the diameter of the roll being crimped.

12. A roll crimper for crimping the protruding ends of a roll wrapper comprising; an overhead support track, means for rotating said roll about a fixed axis beneath said track, first and second crimper assemblies positioned on opposite ends of said roll, each of said assemblies including a support frame, means for mounting said frames for reciprocative movement along said track, each of said assemblies further including a vertically disposed endless conveyor member, rotatable drive means carried by said frames for moving a portion of each of said conveyor members vertically downwardly adjacent the ends of said roll, a plurality of blades fixed to each of said conveyor members in spaced relation, means for imparting intermittent rotation to said drive means, and means carried by said track for selectively moving said frames toward and away from said roll, whereby said blades may be moved into contact with the ends of said roll for crimping said wrapper ends by the combined motion of said blades and said roll.

13. The combination according to claim 12 wherein said rotatable drive means include vertically spaced sprockets carried by each of said support frames, said sprockets being rotatable about horizontal axes at right angles with the axis of said roll, and said conveyor members comprise endless chains trained about said sprockets on each of said assemblies, said blades being fixed to said chains and positioned to contact the ends of the roll during downward movement.

14. The combination according to claim 12 wherein, said means for imparting intermittent rotation to said drive means comprises; an electrical motor and a main drive shaft carried by said track and drivingly connected to said rotatable drive means, switch means for breaking the electrical circuit to said motor in the closed position, timer means responsive to the closing of said switch means for completing the circuit to said motor a predetermined time interval after the closing of said switch means, and control means responsive to the movement of said main drive shaft through a predetermined angle of rotation for closing said switch means.

15. The combination according to claim 14 including means to selectively condition said switch means to vary the position of rotation of said main drive shaft at which said switch means is closed and to vary the interval of said timer means according to the diameter of the roll being crimped.

16. The combination according to claim 14 wherein, said switch means includes a proximity switch and said control means comprises a rotatable member having equally spaced actuator lobes around its periphery, said proximity switch being mounted adjacent the path of said lobes to be closed thereby, said rotatable member being connected to be rotated by said drive shaft with the spacing of said lobes allowing said blades to be moved a distance equal to the distance between blades.

17. The combination according to claim 16 including means to sleectively move said proximity switch relative to said lobes to vary the postion of said main drive shaft at which said switch means is closed according to the diameter of the roll being crimped.

18. A method for crimping the protruding end of a cylindrical roll wrapper including the steps of; rotating said roll in place at a constant speed about its longitudinal axis, moving the first of a number of successive vertically spaced crimper blades downwardly past the top periphery of said roll and in contact with said protruding wrapper during the rotation of said roll to form a crease in said wrapper, halting said blade below the top periphery of the roll for a given increment of time dependent upon the diameter of said roll, then moving successive blades in a like manner downwardly and halting each blade the given increment of time until the protruding wrapper on the entire peripheral extent of said roll is crimped, and then removing said blades from the end of the roll.

19. A method for crimping the protruding end of a cylindrical roll wrapper including the steps of; rotating said roll in place about its longitudinal axis at a constant speed, moving successive vertically spaced crimper blades downwardly past the top perihpery of said roll in contact with said protruding wrapper during the rotation of said roll to form successive creases in said wrapper, halting each of said blades below the top periphery of the roll for a given increment of time dependent upon the diameter of the roll, and then removing said blades after one complete revolution of said roll.

20. A method for crimping the protruding end of a cylindrical roll wrapper including the steps of; rotating said roll in place about its longitudinal axis at a constant speed, moving successive vertically spaced crimper blades downwardly past the top edge of said roll to form successive creases in said wrapper, and halting each of said blades below the top edge of the roll a given increment of time dependent upon the diameter of the roll.

References Cited by the Examiner

UNITED STATES PATENTS 2,938,319  5/1960  Nystrand __________ 53—380 X

TRAVIS S. McGEHEE, *Primary Examiner.*